(12) United States Patent
Zou et al.

(10) Patent No.: US 11,875,271 B2
(45) Date of Patent: Jan. 16, 2024

(54) METHOD AND SYSTEM FOR TRAIN PERIODIC MESSAGE SCHEDULING BASED ON MULTI-OBJECTIVE EVOLUTIONARY ALGORITHM

(71) Applicant: XIANGTAN UNIVERSITY, Xiangtan (CN)

(72) Inventors: Juan Zou, Xiangtan (CN); Qite Yang, Xiangtan (CN); Tingrui Pei, Xiangtan (CN); Jinhua Zheng, Xiangtan (CN); Haibo Li, Xiangtan (CN); Shengqi Chen, Xiangtan (CN); Xiao Yang, Xiangtan (CN); Shengxiang Yang, Xiangtan (CN)

(73) Assignee: XIANGTAN UNIVERSITY, Xiangtan (CN)

( * ) Notice: Subject to any disclaimer, the term of this patent is extended or adjusted under 35 U.S.C. 154(b) by 790 days.

(21) Appl. No.: 17/024,917

(22) Filed: Sep. 18, 2020

(65) Prior Publication Data
US 2021/0089929 A1 Mar. 25, 2021

(30) Foreign Application Priority Data
Sep. 19, 2019 (CN) .......................... 201910885407.X

(51) Int. Cl.
*G06N 3/08* (2023.01)
*G06N 3/126* (2023.01)
(Continued)

(52) U.S. Cl.
CPC .............. *G06N 3/126* (2013.01); *G06N 3/086* (2013.01); *G06F 2111/06* (2020.01)

(58) Field of Classification Search
None
See application file for complete search history.

(56) References Cited

FOREIGN PATENT DOCUMENTS
CN 110084360 A * 8/2019 ........... G06N 3/0445

OTHER PUBLICATIONS

Huang et al ("Saving Energy and Improving Service Quality: Bicriteria Train Scheduling in Urban Rail Transit Systems" 2016) (Year: 2016).*

(Continued)

*Primary Examiner* — Lut Wong
(74) *Attorney, Agent, or Firm* — HEA Law PLLC; Darrin Auito

(57) ABSTRACT

The present invention provides a method and a system for train periodic message scheduling based on a multi-objective evolutionary algorithm, relating to the field of information and communications technology, mainly including: acquiring an MVB periodic message table; binary encoding the MVB periodic message table and initializing it randomly, to generate an iterative population; performing crossover and mutation operations on the individuals of the iterative population using a genetic algorithm, to update the iterative population; constructing an MVB periodic scheduling table that meets scheduling needs and minimizes the macro cycle according to a multi-objective algorithm and the updated iterative population; scheduling train periodic messages according to the MVB periodic scheduling table, thereby meeting the real-time requirement of periodic data transmission in actual scheduling scenarios.

8 Claims, 5 Drawing Sheets

(51) Int. Cl.
  *G06N 3/086* (2023.01)
  *G06F 111/06* (2020.01)

(56) References Cited

OTHER PUBLICATIONS

Wang et al ("Multi-Objective Shark Smell Optimization Algorithm Using Incorporated Composite Angle Cosine for Automatic Train Operation" Feb. 2020) (Year: 2020).*

* cited by examiner

METHOD AND SYSTEM FOR TRAIN PERIODIC MESSAGE SCHEDULING BASED ON MULTI-OBJECTIVE EVOLUTIONARY ALGORITHM

TECHNICAL FIELD

The present disclosure relates to the field of information and communications technology, and in particular, to a method for train periodic message scheduling based on a multi-objective evolutionary algorithm, and a system thereof.

BACKGROUND

Multifunction Vehicle Bus (MVB) is a network bus for the interconnection of various functional devices inside the vehicle, specifically defined in IEC 61375-1. It is one of the standards for train communication networks, and has been widely used in subway trains, high-speed trains, etc. In real-time communication, the transmission of periodic data is scheduled mainly by a bus management device using a periodic scheduling table. At present, the algorithms for constructing a periodic scheduling table generally include: RM algorithm, EDF algorithm, DM algorithm and LSF algorithm. These algorithms are mostly based on a series of ideal assumptions, and are limited in their load balancer performances. Moreover, the algorithms have low rates of convergence, and cannot meet the real-time requirement of periodic data transmission in actual scheduling scenarios.

SUMMARY OF PARTICULAR EMBODIMENTS

An object of the present disclosure is to provide a method for train periodic message scheduling based on a multi-objective evolutionary algorithm, and a system thereof, which can meet the real-time requirement of periodic data transmission in actual scheduling scenarios.

In order to achieve the object above, the present disclosure provides the following technical solutions:

A method for train periodic message scheduling based on a multi-objective evolutionary algorithm, comprising:
  acquiring an MVB periodic message table, where the MVB periodic message table includes K periodic messages to be transmitted; each of the periodic messages has a period, a processing time and a priority; and the MVB periodic message table corresponds to a macro cycle containing N micro cycles;
  binary encoding the MVB periodic message table and initializing it randomly, to generate an iterative population, where the iterative population includes M individuals; each of the individuals includes K binary codes; each of the binary codes is obtained from: binary encoding a sequential number of the micro cycle in which a periodic message is scheduled for the first time, and then initializing it randomly; and different binary codes correspond to different periodic messages;
  performing crossover and mutation operations on the individuals of the iterative population using a genetic algorithm, to update the iterative population, the number of individuals in the updated iterative population being 2M;
  calculating a fitness value for each individual in the updated iterative population according to a constructed multi-objective function, and recording the current number of iterations, where the multi-objective function includes a first objective calculation function and a second objective calculation function; the fitness value is the sum of a first objective and a second objective; the first objective is the sum of sequential numbers of all the micro cycles in which the periodic messages are scheduled for the first time respectively; the second objective is the sum of the processing times for all the periodic messages;
  determining whether the current number of iterations is less than a preset total number of iterations, to obtain a first determination result;
  if the first determination result indicates that the current number of iterations is less than the preset total number of iterations, adding 1 to the current number of iterations, then performing dominated selection and sequencing on the individuals of the updated iterative population according to the fitness value of each individual, and selecting the top M individuals to form a next-generation iterative population and returning to the step of performing crossover and mutation operations on the individuals of the iterative population using a genetic algorithm to update the iterative population;
  if the first determination result indicates that the current number of iterations is not less than the preset total number of iterations, constructing an MVB periodic scheduling table according to the individuals with the smallest fitness values;
  scheduling periodic messages according to the MVB periodic scheduling table.

Optionally, the binary encoding the MVB periodic message table and initializing it randomly to generate an iterative population comprises:
  for each periodic message, binary encoding a sequential number of the micro cycle in which the periodic message is scheduled for the first time, to obtain K binary codes;
  joining the K binary codes in the order of the priorities of the periodic messages, to make a string of binary codes;
  initializing the string of binary codes randomly, to generate an iterative population including M individuals.

Optionally, the first objective calculation function is:

$$F = \sum_{k}^{K} \text{Decimal}(Bin_k),$$

where $Bin_k$ denotes a k-th binary code, $\text{Decimal}(Bin_k)$ denotes the decimal version of the k-th binary code;
the second objective calculation function is:

$$T_{Mp} = N * \max_{n \in \{1,\dots,N\}} \frac{T_{actual(n)}}{60\%},$$

where $T_{actual(n)}$ denotes the actual processing time of an n-th micro cycle.

Optionally, the performing dominated selection and sequencing on the individuals of the updated iterative population according to the fitness value of each individual and selecting the top M individuals to form a next-generation iterative population comprises:
  performing dominated selection, using a Pareto dominated strategy, on the individuals of the updated iterative population according to the fitness value of each individual;

sequencing the individuals after the dominated selection, and selecting the top M individuals to form a next-generation iterative population.

The present disclosure also provides a system for train periodic message scheduling based on a multi-objective evolutionary algorithm, comprising:

an MVB periodic message table acquiring module, adapted to acquire an MVB periodic message table, where the MVB periodic message table includes K periodic messages to be transmitted; each of the periodic messages has a period, a processing time and a priority; and the MVB periodic message table corresponds to a macro cycle containing N micro cycles;

an iterative population generating module, adapted to binary encode the MVB periodic message table and initialize it randomly, to generate an iterative population, where the iterative population includes M individuals; each of the individuals includes K binary codes; each of the binary codes is obtained from: binary encoding a sequential number of the micro cycle in which a periodic message is scheduled for the first time, and then initializing it randomly; and different binary codes correspond to different periodic messages;

a crossover and mutation module, adapted to perform crossover and mutation operations on the individuals of the iterative population using a genetic algorithm, to update the iterative population, the number of individuals in the updated iterative population being 2M;

a fitness value calculating module, adapted to calculate a fitness value for each individual in the updated iterative population according to a constructed multi-objective function, and record the current number of iterations, where the multi-objective function includes a first objective calculation function and a second objective calculation function; the fitness value is the sum of a first objective and a second objective; the first objective is the sum of sequential numbers of all the micro cycles in which the periodic messages are scheduled for the first time respectively; the second objective is the sum of the processing times for all the periodic messages;

a determining module, adapted to determine whether the current number of iterations is less than a preset total number of iterations, to obtain a first determination result;

a next-generation iterative population generating module, adapted to, when the first determination result indicates that the current number of iterations is less than the preset total number of iterations, add 1 to the current number of iterations, perform dominated selection and sequencing on the individuals of the updated iterative population according to the fitness value of each individual, and select the top M individuals to form a next-generation iterative population and return it to the crossover and mutation module;

an MVB periodic scheduling table constructing module, adapted to, when the first determination result indicates that the current number of iterations is not less than the preset total number of iterations, construct an MVB periodic scheduling table according to the individuals with the smallest fitness values;

a scheduling module, adapted to schedule periodic messages according to the MVB periodic scheduling table.

Optionally, the iterative population generating module comprises:

an encoding unit, adapted to, for each periodic message, binary encode a sequential number of the micro cycle in which the periodic message is scheduled for the first time, to obtain K binary codes;

a joining unit, adapted to join the K binary codes into a string of binary codes;

an iterative population generating unit, adapted to initialize the string of binary codes randomly, to generate an iterative population including M individuals.

Optionally, in the fitness value calculating module, the first objective calculation function is:

$$F = \sum_{k}^{K} \text{Decimal}(Bin_k),$$

where $Bin_k$ denotes a k-th binary code, $\text{Decimal}(Bin_k)$ denotes the decimal version of the k-th binary code;

in the fitness value calculating module 400, the second objective calculation function is:

$$T_{Mp} = N * \max_{n \in \{1,\ldots,N\}} \frac{T_{actual(n)}}{60\%},$$

where $T_{actual(n)}$ denotes the actual processing time of an n-th micro cycle.

Optionally, the next-generation iterative population generating module comprises:

a current number of iterations updating unit, adapted to add 1 to the current number of iterations, to update the current number of iterations;

a dominated selection unit, adapted to perform dominated selection, using a Pareto dominated strategy, on the individuals of the updated iterative population according to the fitness value of each individual;

a next-generation iterative population generating unit, adapted to sequence the individuals after the dominated selection, and select the top M individuals to form a next-generation iterative population.

According to the embodiments of the present disclosure, the present disclosure has the following technical effects:

The present disclosure provides a method and a system for train periodic message scheduling based on a multi-objective evolutionary algorithm, first constructing an MVB periodic scheduling table that meets scheduling needs and minimizes the macro cycle according to a multi-objective algorithm, and then scheduling train periodic messages according to the MVB periodic scheduling table, thereby meeting the real-time requirement of periodic data transmission in actual scheduling scenarios.

BRIEF DESCRIPTION OF THE DRAWINGS

To make clearer the technical solutions in the embodiments of the present disclosure or the prior art, accompanying drawings used in the embodiments are briefly described below. As a matter of course, these drawings are only some examples of the invention; those skilled in the art can make other drawings based on these drawings without inventive effort.

DETAILED DESCRIPTION OF PARTICULAR EMBODIMENTS

The technical solutions in the embodiments of the present disclosure will be described hereinafter clearly and completely in conjunction with the accompany drawings. As a matter of course, the embodiments described herein are only some exemplary embodiments of the invention; any other embodiment obtained by those skilled in the art based on the embodiments herein without inventive effort shall fall within the scope of the invention.

For a better understanding of the above objects, characteristics and advantages of the present disclosure, the present disclosure is described below in more detail with reference to the drawings and the embodiments.

Embodiment I

Figure 1:
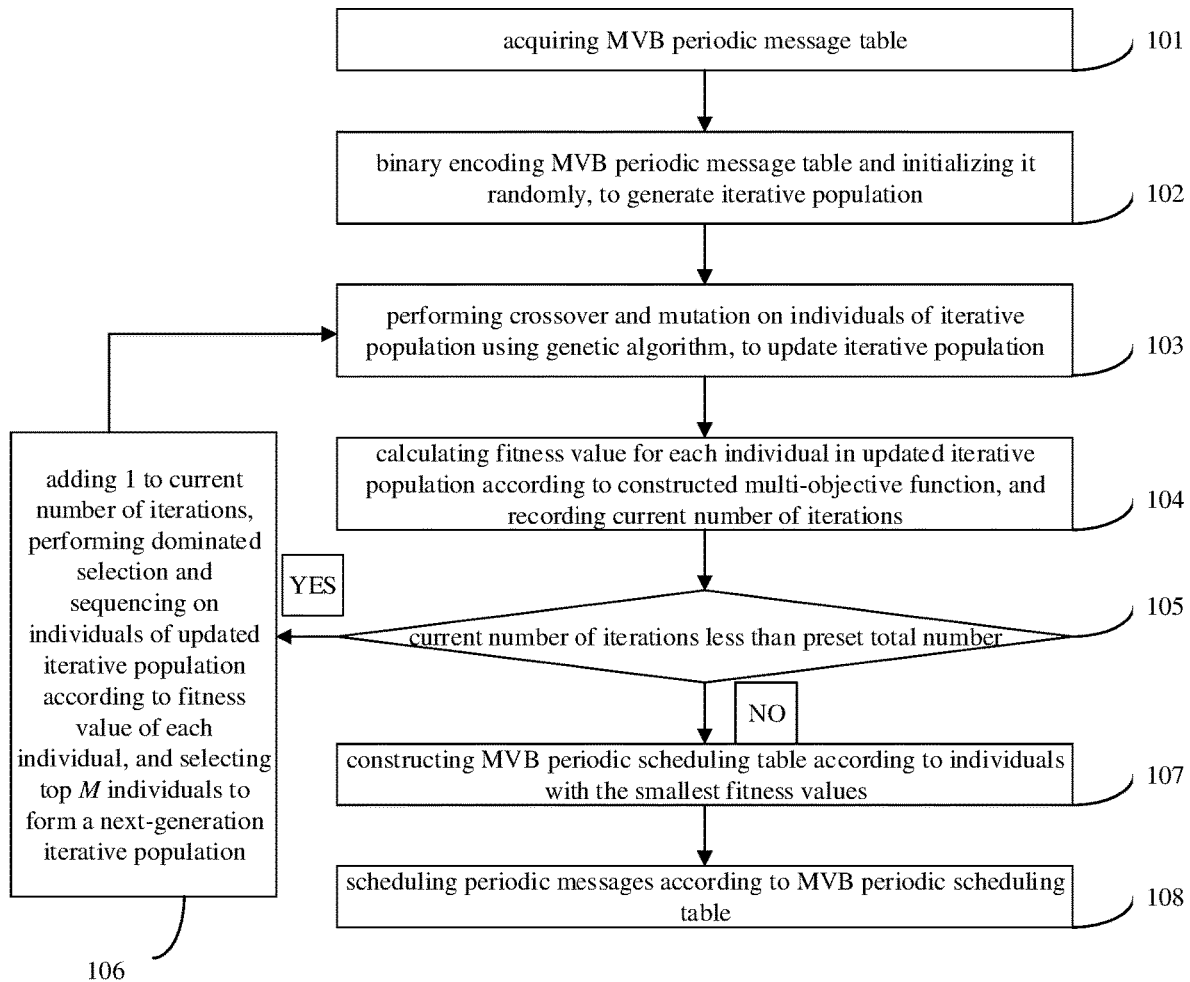
FIG. 1 is a flowchart of a method for train periodic message scheduling based on a multi-objective evolutionary algorithm according to an embodiment of the present disclosure.

As shown in FIG. 1, a method for train periodic message scheduling based on a multi-objective evolutionary algorithm according to an embodiment of the present disclosure includes the following steps:

Step 101: acquiring an MVB periodic message table, where the MVB periodic message table includes K periodic messages to be transmitted; each of the periodic messages has a period, a processing time and a priority; and the MVB periodic message table corresponds to a macro cycle containing N micro cycles.

A researcher may acquire an MVB periodic message table of an exemplary case. The MVB periodic message table includes the periods $T_k$, processing times $C_k$ and priorities of K periodic messages to be transmitted (k=1, 2, . . . , K). According to the MVB periodic message table, the number of micro cycles contained in a macro cycle is N.

Step 102: binary encoding the MVB periodic message table and initializing it randomly, to generate an iterative population (a set of solutions identified with the first time a periodic message is scheduled), where the iterative population includes M individuals; each of the individuals includes K binary codes; each of the binary codes is obtained from: binary encoding a sequential number of the micro cycle in which a periodic message is scheduled for the first time, and then initializing it randomly; and different binary codes correspond to different periodic messages.

Specifically, step 102 includes:

First, for each periodic message, binary encoding a sequential number of the micro cycle in which the periodic message is scheduled for the first time, the result being $Bun_k$; and joining the results for all the periodic messages in the order of their priorities, to make a string of binary codes $Bin=(Bin_1, Bin_2, \ldots, Bin_K)$, which is one individual;

Then, initializing the individual randomly using a binary encoding method, to generate an iterative population of size 100, that is, M=100.

Step 103: performing crossover and mutation operations on the individuals of the iterative population using a genetic algorithm, to update the iterative population, the number of individuals in the updated iterative population being 2M.

Specifically, selecting two individuals randomly from the iterative population, and performing crossover and mutation operations to obtain two new individuals; repeating this process, to generate a new population of the same size; adding the new population to the iterative population, to obtain an updated iterative population.

Step 104: calculating a fitness value for each individual in the updated iterative population according to a constructed multi-objective function, and recording the current number of iterations, where the multi-objective function includes a first objective calculation function and a second objective calculation function; the fitness value is the sum of a first objective and a second objective; the first objective is the sum of sequential numbers of all the micro cycles in which the periodic messages are scheduled for the first time respectively; the second objective is the sum of the processing times for all the periodic messages.

The length of a micro cycle can be calculated using the binary encoded sequential numbers of the micro cycles in which the periodic messages are scheduled for the first time.

Specifically, $Bin_k$ is converted into decimal, i.e., Decimal($Bin_k$). The equation for calculating the sum of sequential numbers of all the micro cycles in which the periodic messages are scheduled for the first time (i.e., first objective calculation function) is:

$$F = \sum_{k}^{K} \text{Decimal}(Bin_k), \quad (1)$$

where $Bin_k$ denotes a $k$-$th$ binary code,

Decimal ($Bin_k$)

denotes the decimal version of the k-th binary code.

In order to realize preferential processing for every periodic message to the greatest extent possible, F should be minimized.

According to the periods in the MVB periodic message table and the cycles of each periodic message in the macro cycle, for each micro cycle, it is determined how the periodic messages are processed in the micro cycle, and then an actual processing time $T_{actual(n)}$ of the micro cycle is calculated according to the equation:

$$T_{actual(n)} = = \sum_{k \in n} C_k, \quad (2)$$

where $k \in n$ indicates that a k-th periodic messages is processed in an n-th micro cycle.

According to time allocation requirements for micro cycles in IEC 61375-1 standard, the total time used for processing periodic messages in a micro cycle should not exceed 60% of the length of the micro cycle. Therefore, for each micro cycle, the time used for processing periodic messages in the micro cycle is set to 60%, in order to minimize the micro cycles; the actual processing time of the micro cycle can be obtained accordingly. The equation is:

$$T_{bp} = \max_{n \in \{1,\ldots,N\}} \frac{T_{actual(n)}}{60\%}, \quad (3)$$

where $T_{actual(n)}$ denotes the actual processing time of an n-th micro cycle.

The equation for the corresponding macro period (i.e., second objective calculation function) is:

$$T_{Mp} = N * \max_{n \in \{1,\ldots,N\}} \frac{T_{actual(n)}}{60\%}. \quad (4)$$

Then, calculating F and $T_{Mp}$ values for each individual of the updated iterative population by substituting the individuals of the updated iterative population into Equations (1) and (2), using them as a fitness of the individual, and analyzing its feasibility, the smaller the fitness, the more preferred the individual.

Step 105: determining whether the current number of iterations is less than a preset total number of iterations, to obtain a first determination result, and if the first determination result indicates that the current number of iterations is less than the preset total number of iterations, executing step 106; if the first determination result indicates that the current number of iterations is not less than the preset total number of iterations, executing step 107.

Step 106: adding 1 to the current number of iterations, then performing dominated selection and sequencing on the individuals of the updated iterative population according to the fitness value of each individual, and selecting the top M individuals to form a next-generation iterative population and returning to step 103.

In this embodiment, in order to minimize the macro cycle and to realize preferential processing for every periodic message to the greatest extent possible, all the individuals have undergone Pareto dominated selection and sequencing, and the top 100 individuals with the best diversities and smallest differences are selected to form the next-generation iterative population.

Figure 2:
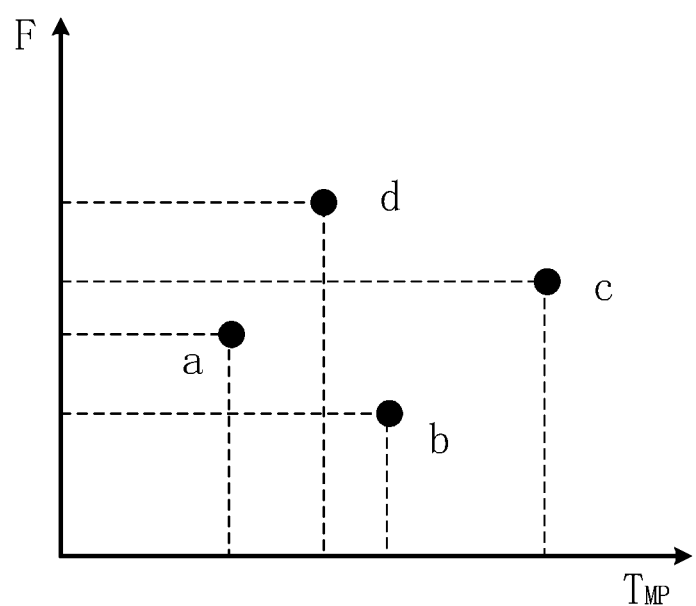
FIG. 2 is a schematic diagram illustrating a Pareto dominated situation according to an embodiment of the present disclosure.

Pareto dominated selection is a strategy to select a more preferred individual from two individuals. Each time it selects an individual having better values on both objectives as the preferred individual. As shown in FIG. 2, individual a having smaller values on both objectives F and $T_{Mp}$ than individual d, therefore individual a dominates individual d; similarly, individual b dominates individual c. Individuals a and individual b do not dominate each other, and they are both preferred ones.

Step 107: constructing an MVB periodic scheduling table according to the individuals with the smallest fitness values.

Step 108: scheduling periodic messages according to the MVB periodic scheduling table.

In the embodiment, steps 106-107 can be replaced by the following method: when the current number of iterations meets a preset total number of iterations, outputting an iterative population (a set of solutions identified with the first time a periodic message is scheduled) corresponding to the current number of iterations; and manually selecting, verifying and modifying according to the output population.

An individual (a solution identified with the first time a periodic message is scheduled) may be manually selected, to obtain micro cycles in which the periodic messages are scheduled for the first time, respectively. Then a complete MVB periodic scheduling table can be obtained further according to the periods in the periodic message table.

It should be noted that, when an iterative population has been newly generated from initialization, crossover and mutation operations are performed on the individuals (solutions identified with the first time a periodic message is scheduled) of the newly generated iterative population, to generate a new-generation population; fitness values F and $T_{Mp}$ are calculated for each individual; dominated selection are performed according to the fitness values; the top 100 individuals are selected to form a new iterative population and then step 103 is returned for further operations.

Embodiment II

Figure 3:
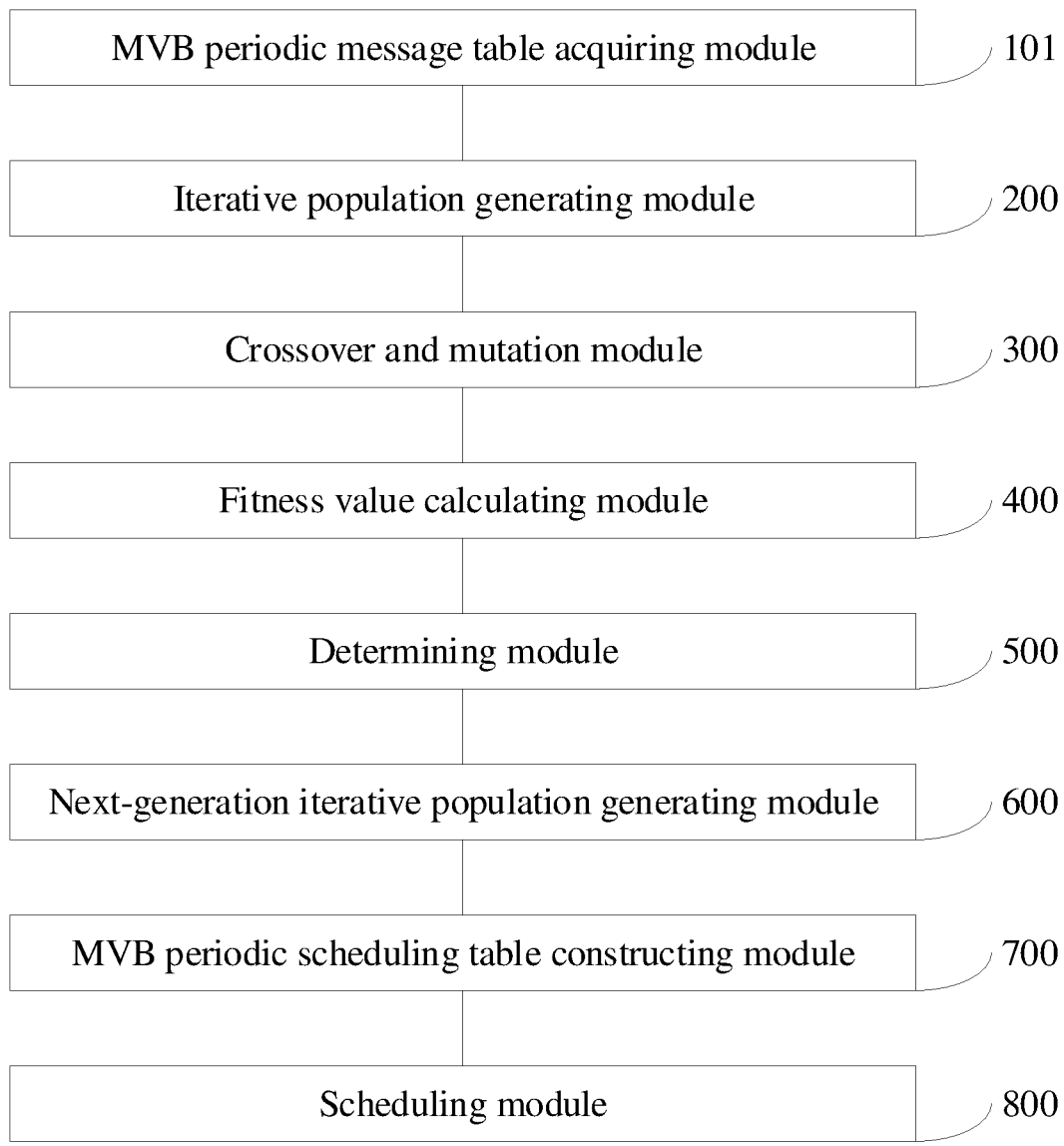
FIG. 3 is a structural diagram of a system for train periodic message scheduling based on a multi-objective evolutionary algorithm according to an embodiment of the present disclosure.

As shown in FIG. 3, a system for train periodic message scheduling based on a multi-objective evolutionary algorithm according to an embodiment of the present disclosure includes:

an MVB periodic message table acquiring module 100, adapted to acquire an MVB periodic message table, where the MVB periodic message table includes K periodic messages to be transmitted; each of the periodic messages has a period, a processing time and a priority; and the MVB periodic message table corresponds to a macro cycle containing N micro cycles;

an iterative population generating module 200, adapted to binary encode the MVB periodic message table and initialize it randomly, to generate an iterative population, where the iterative population includes M individuals; each of the individuals includes K binary codes; each of the binary codes is obtained from: binary encoding a sequential number of the micro cycle in which a periodic message is scheduled for the first time, and then initializing it randomly; and different binary codes correspond to different periodic messages;

a crossover and mutation module 300, adapted to perform crossover and mutation operations on the individuals of the iterative population using a genetic algorithm, to update the iterative population, the number of individuals in the updated iterative population being 2M;

a fitness value calculating module 400, adapted to calculate a fitness value for each individual in the updated iterative population according to a constructed multi-objective function, and record the current number of iterations, where the multi-objective function includes a first objective calculation function and a second objective calculation function; the fitness value is the sum of a first objective and a second objective; the first objective is the sum of sequential numbers of all the micro cycles in which the periodic messages are scheduled for the first time respectively; the second objective is the sum of the processing times for all the periodic messages;

a determining module 500, adapted to determine whether the current number of iterations is less than a preset total number of iterations, to obtain a first determination result;

a next-generation iterative population generating module 600, adapted to, when the first determination result indicates that the current number of iterations is less than the preset total number of iterations, add 1 to the current number of iterations, perform dominated selection and sequencing on the individuals of the updated iterative population according to the fitness value of each individual, and select the top M individuals to form a next-generation iterative population and return it to the crossover and mutation module 300;

an MVB periodic scheduling table constructing module 700, adapted to, when the first determination result indicates that the current number of iterations is not less than the preset total number of iterations, construct an MVB periodic scheduling table according to the individuals with the smallest fitness values;

a scheduling module 800, adapted to schedule periodic messages according to the MVB periodic scheduling table.

Specifically, the iterative population generating module 200 includes:

an encoding unit, adapted to, for each periodic message, binary encode a sequential number of the micro cycle in which the periodic message is scheduled for the first time, to obtain K binary codes;

a joining unit, adapted to join the K binary codes into a string of binary codes;

an iterative population generating unit, adapted to initialize the string of binary codes randomly, to generate an iterative population including M individuals.

In the fitness value calculating module 400, the first objective calculation function is:

$$F = \sum_{k}^{K} \text{Decimal}(Bin_k),$$

where $Bin_k$ denotes a k-th binary code, $\text{Decimal}(Bin_k)$ denotes the decimal version of the k-th binary code.

In the fitness value calculating module 400, the second objective calculation function is:

$$T_{Mp} = N * \max_{n \in \{1,\ldots,N\}} \frac{T_{actual(n)}}{60\%},$$

where $T_{actual(n)}$ denotes the actual processing time of an n-th micro cycle.

Specifically, the next-generation iterative population generating module 600 includes:

a current number of iterations updating unit, adapted to add 1 to the current number of iterations, to update the current number of iterations;

a dominated selection unit, adapted to perform dominated selection, using a Pareto dominated strategy, on the individuals of the updated iterative population according to the fitness value of each individual;

a next-generation iterative population generating unit, adapted to sequence the individuals after the dominated selection, and select the top M individuals to form a next-generation iterative population.

Embodiment III

In this embodiment, the MVB periodic message table shown in Table 1 is the basic input information.

TABLE 1

| MVB periodic message table | | | |
|---|---|---|---|
| Periodic Message | Period $T_k$ | Processing Time $C_k/\mu s$ | Priority |
| $M_1$ | 1 | 48 | 1 (highest) |
| $M_2$ | 2 | 59 | 2 |

TABLE 1-continued

| MVB periodic message table | | | |
|---|---|---|---|
| Periodic Message | Period $T_k$ | Processing Time $C_k/\mu s$ | Priority |
| $M_3$ | 2 | 131 | 3 |
| $M_4$ | 4 | 83 | 4 |
| $M_5$ | 8 | 131 | 5 |
| $M_6$ | 8 | 59 | 6 (lowest) |

The MVB periodic message table includes six periodic messages, hence K=6. The maximum period is 8, hence N=8, and the encoding of Bunk requires 3 bits. Each individual is represented by a 18-bit binary number. As shown in Table 2, a population (100 18-bit binary numbers) is randomly generated using a multi-objective evolutionary algorithm.

TABLE 2

| Population table | | | | | | |
|---|---|---|---|---|---|---|
| | $Bin_1$ | $Bin_2$ | $Bin_3$ | $Bin_4$ | $Bin_5$ | $Bin_6$ |
| Individual 1 | 010 | 101 | 100 | 010 | 100 | 011 |
| Individual 2 | 011 | 011 | 101 | 011 | 010 | 111 |
| ... | ... | ... | ... | ... | ... | ... |
| Individual 99 | 101 | 101 | 100 | 110 | 010 | 011 |
| Individual 100 | 0001 | 011 | 010 | 011 | 010 | 010 |

Figure 4:
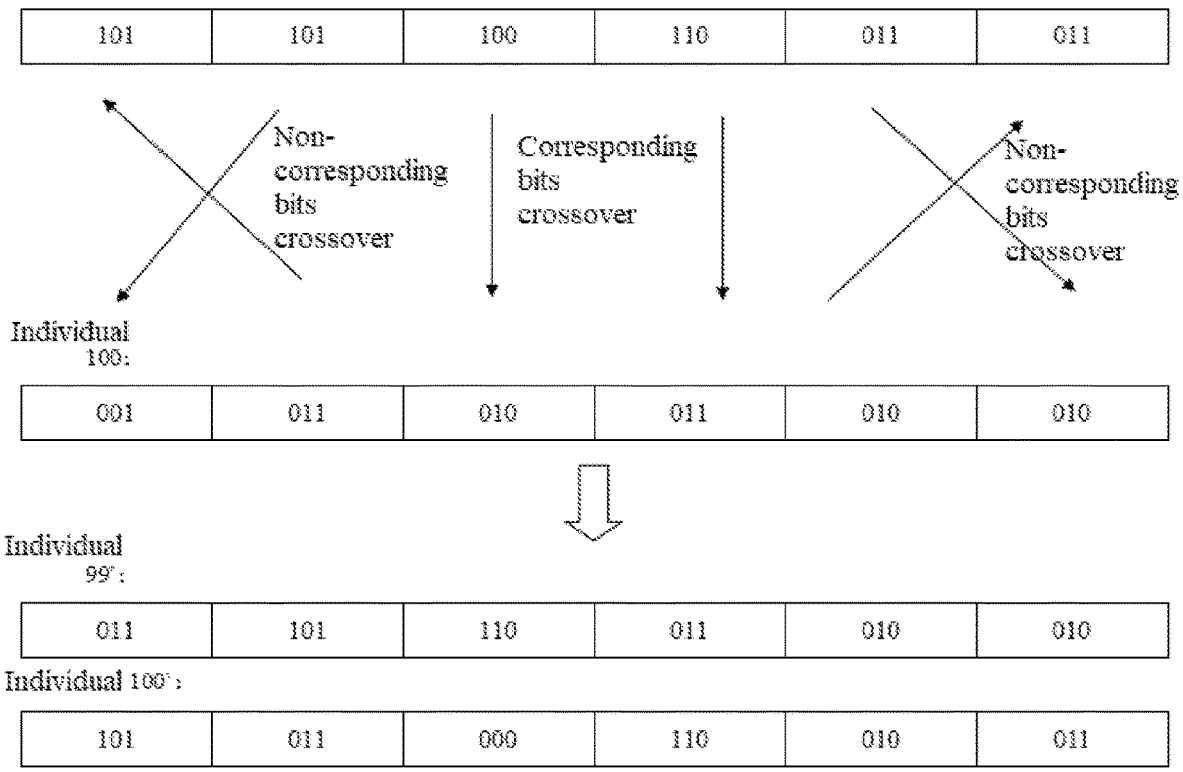
FIG. 4 is a schematic diagram illustrating the result of a crossover between individual 99 and individual 100 according to an embodiment of the present disclosure.

Of the 100 individuals initialized, the decimal version of the individuals (solutions identified with the first time a periodic message is scheduled) 1, 2, 99, and 100 are 365354, 446438, 665744 and 243433. F and $T_{Mp}$ are calculated by substituting the individuals into Equations (1) and (4). The 100 individuals initialized include many non-preferred solutions, failing to meet the requirements. Then, crossover and mutation operations are performed to generate new individuals. Crossover swaps one or more bits between two individuals. Assuming that individuals 99 and 100 are parent individuals, the crossover result is shown in FIG. 4.

Figure 5:
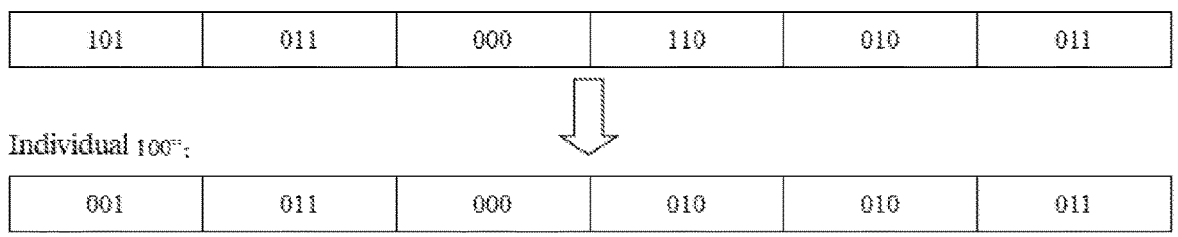
FIG. 5 is a schematic diagram illustrating the result of a mutation of individual 100 according to an embodiment of the present disclosure.

Mutation alters one or more digits of an individual randomly. Assuming that mutation occurs to individual 100', and that arbitrary bits $Bin_1$ and $Bin_4$ are altered, the mutation result is shown in FIG. 5.

After the crossover and mutation operations, there is a great probability that two preferred individuals produce two new preferred individuals. A simple crossover cannot get anything better than a local optimum; but a mutation can search globally, outside the local optimum. As a matter of course, a new individual may not be as good as the parent; however, in elitist selection, non-elite individuals will be discarded. F and T values are calculated by substituting the new individuals into Equations (1) and (4); and the new individuals are added to the population. By Pareto dominated selection and sequencing, the top 100 elite individuals are maintained, as the parents to a next generation. This process is repeated, until the best individuals are generated and the last-generation population are output. It should be noted that in the crossover and mutation operations, the crossover bits and mutation bits are determined randomly, with a crossover probability of 100%, and a mutation probability of 5%.

From the last-generation population, an individual (a solution identified with the first time a periodic message is scheduled) may be selected by a technician: (000, 001, 000, 001, 001, 000), and an MVB periodic scheduling table, shown in Table 3, can be obtained using the periods in the periodic message table.

TABLE 3

MVB periodic scheduling table

| Periodic Message | Micro Cycle | | | | | | | |
|---|---|---|---|---|---|---|---|---|
| | 1 | 2 | 3 | 4 | 5 | 6 | 7 | 8 |
| $M_1$ | 1 | 1 | 1 | 1 | 1 | 1 | 1 | 1 |
| $M_2$ | 0 | 1 | 0 | 1 | 0 | 1 | 0 | 1 |
| $M_3$ | 1 | 0 | 1 | 0 | 1 | 0 | 1 | 0 |
| $M_4$ | 0 | 1 | 0 | 0 | 0 | 1 | 0 | 0 |
| $M_5$ | 0 | 1 | 0 | 0 | 0 | 0 | 0 | 0 |
| $M_6$ | 1 | 0 | 0 | 0 | 0 | 0 | 0 | 0 |

Figure 6:
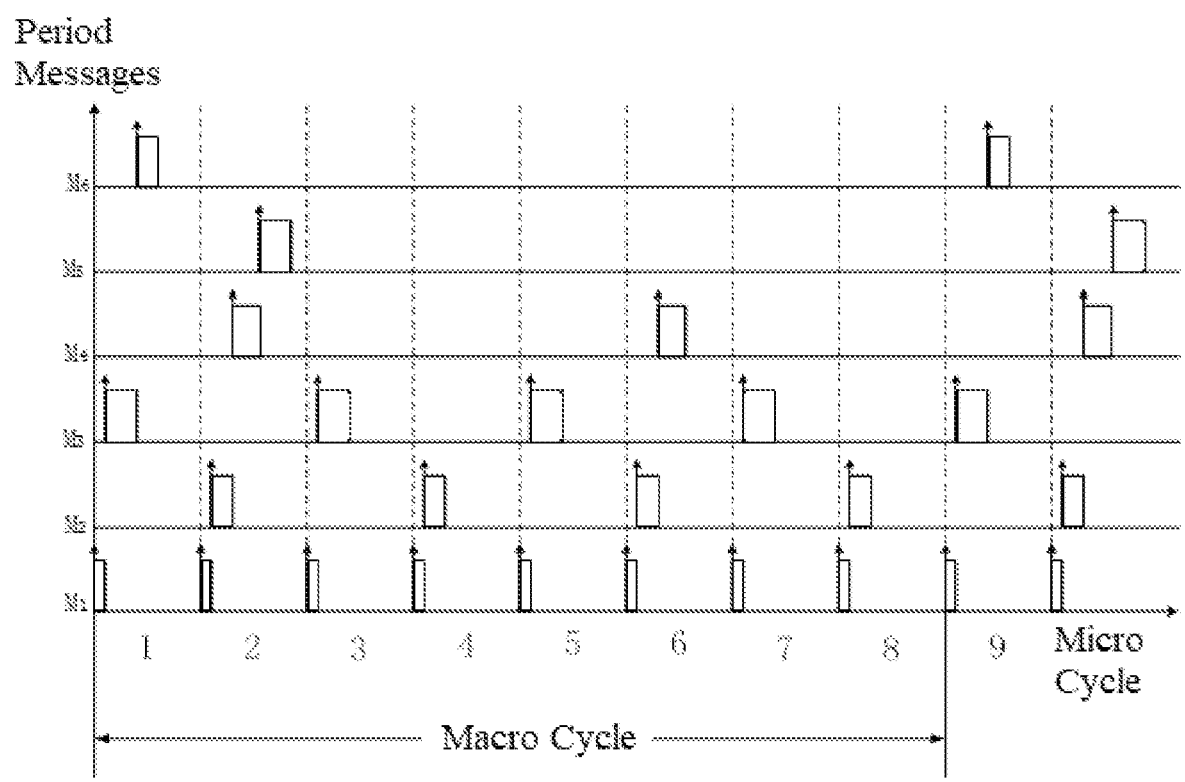
FIG. 6 is a schematic diagram illustrating a real-time scheduling of MVB periodic messages according to an embodiment of the present invention.

Finally, as shown in FIG. 6, train communication network periodic messages are scheduled according to the MVB periodic scheduling table.

Based on the principles of MVB periodic message transmission, the present disclosure provides a new algorithm for generating an MVB periodic scheduling table by using a relationship between periodic messages and a multi-objective evolutionary algorithm. This method is high in data volume and produces a large set of iterative solutions; scheduling train communication network periodic messages according to the MVB periodic scheduling table can meet the real-time requirement of periodic data transmission in actual scheduling scenarios.

The embodiments in this specification are described in a progressive manner, with each embodiment focusing on the differences with other embodiments, and the same or similar parts between the embodiments can be referred to one another. System embodiments correspond to method embodiments and thus are only briefly described; please refer to the method section for relevant parts.

The principles and implementations of the present disclosure are described in detail in conjunction with specific embodiments. The specific embodiments are for illustrative purposes only and shall not be construed as limiting. Those skilled in the art can make modifications to the embodiments and applications described herein without deviation from the scope of the invention. In summary, the content of this specification should not be construed as limiting the scope of the invention.

What is claimed is:

1. A method for train periodic message scheduling based on a multi-objective evolutionary algorithm, comprising:
    acquiring an MVB periodic message table, where the MVB periodic message table includes K periodic messages to be transmitted; each of the periodic messages has a period, a processing time and a priority; and the MVB periodic message table corresponds to a macro cycle containing N micro cycles;
    binary encoding the MVB periodic message table and initializing it randomly, to generate an iterative population, where the iterative population includes M individuals; each of the individuals includes K binary codes; each of the binary codes is obtained from: binary encoding a sequential number of the micro cycle in which a periodic message is scheduled for the first time, and then initializing it randomly; and different binary codes correspond to different periodic messages;
    performing crossover and mutation operations on the individuals of the iterative population using a genetic algorithm, to update the iterative population, the number of individuals in the updated iterative population being 2M;
    calculating a fitness value for each individual in the updated iterative population according to a constructed multi-objective function, and recording the current number of iterations, where the multi-objective function includes a first objective calculation function and a second objective calculation function; the fitness value is the sum of a first objective and a second objective; the first objective is the sum of sequential numbers of all the micro cycles in which the periodic messages are scheduled for the first time respectively; the second objective is the sum of the processing times for all the periodic messages;
    determining whether the current number of iterations is less than a preset total number of iterations, to obtain a first determination result;
    if the first determination result indicates that the current number of iterations is less than the preset total number of iterations, adding 1 to the current number of iterations, then performing dominated selection and sequencing on the individuals of the updated iterative population according to the fitness value of each individual, and selecting the top M individuals to form a next-generation iterative population and returning to the step of performing crossover and mutation operations on the individuals of the iterative population using a genetic algorithm to update the iterative population;
    if the first determination result indicates that the current number of iterations is not less than the preset total number of iterations, constructing an MVB periodic scheduling table according to the individuals with the smallest fitness values;
    scheduling periodic messages according to the MVB periodic scheduling table.

2. The method for train periodic message scheduling based on a multi-objective evolutionary algorithm according to claim 1, wherein the binary encoding the MVB periodic message table and initializing it randomly to generate an iterative population comprises:
    for each periodic message, binary encoding a sequential number of the micro cycle in which the periodic message is scheduled for the first time, to obtain K binary codes;
    joining the K binary codes in the order of the priorities of the periodic messages, to make a string of binary codes;
    initializing the string of binary codes randomly, to generate an iterative population including M individuals.

3. The method for train periodic message scheduling based on a multi-objective evolutionary algorithm according to claim 1, wherein the first objective calculation function is:

$$F = \sum_{k}^{K} \text{Decimal}(Bin_k),$$

where $Bin_k$ denotes a k-th binary code, $\text{Decimal}(Bin_k)$ denotes the decimal version of the k-th binary code;
the second objective calculation function is:

$$T_{Mp} = N * \max_{n \in \{1,...,N\}} \frac{T_{actual(n)}}{60\%},$$

where $T_{actual(n)}$ denotes the actual processing time of an n-th micro cycle.

4. The method for train periodic message scheduling based on a multi-objective evolutionary algorithm according to claim 1, wherein the performing dominated selection and sequencing on the individuals of the updated iterative population according to the fitness value of each individual and selecting the top M individuals to form a next-generation iterative population comprises:
performing dominated selection, using a Pareto dominated strategy, on the individuals of the updated iterative population according to the fitness value of each individual;
sequencing the individuals after the dominated selection, and selecting the top M individuals to form a next-generation iterative population.

5. A system for train periodic message scheduling based on a multi-objective evolutionary algorithm, comprising:
an MVB periodic message table acquiring module, adapted to acquire an MVB periodic message table, where the MVB periodic message table includes K periodic messages to be transmitted; each of the periodic messages has a period, a processing time and a priority; and the MVB periodic message table corresponds to a macro cycle containing N micro cycles;
an iterative population generating module, adapted to binary encode the MVB periodic message table and initialize it randomly, to generate an iterative population, where the iterative population includes M individuals; each of the individuals includes K binary codes; each of the binary codes is obtained from: binary encoding a sequential number of the micro cycle in which a periodic message is scheduled for the first time, and then initializing it randomly; and different binary codes correspond to different periodic messages;
a crossover and mutation module, adapted to perform crossover and mutation operations on the individuals of the iterative population using a genetic algorithm, to update the iterative population, the number of individuals in the updated iterative population being 2M;
a fitness value calculating module, adapted to calculate a fitness value for each individual in the updated iterative population according to a constructed multi-objective function, and record the current number of iterations, where the multi-objective function includes a first objective calculation function and a second objective calculation function; the fitness value is the sum of a first objective and a second objective; the first objective is the sum of sequential numbers of all the micro cycles in which the periodic messages are scheduled for the first time respectively; the second objective is the sum of the processing times for all the periodic messages;
a determining module, adapted to determine whether the current number of iterations is less than a preset total number of iterations, to obtain a first determination result;
a next-generation iterative population generating module, adapted to, when the first determination result indicates that the current number of iterations is less than the preset total number of iterations, add 1 to the current number of iterations, perform dominated selection and sequencing on the individuals of the updated iterative population according to the fitness value of each individual, and select the top M individuals to form a next-generation iterative population and return it to the crossover and mutation module;
an MVB periodic scheduling table constructing module, adapted to, when the first determination result indicates that the current number of iterations is not less than the preset total number of iterations, construct an MVB periodic scheduling table according to the individuals with the smallest fitness values;
a scheduling module, adapted to schedule periodic messages according to the MVB periodic scheduling table.

6. The system for train periodic message scheduling based on a multi-objective evolutionary algorithm according to claim 5, wherein the iterative population generating module comprises:
an encoding unit, adapted to, for each periodic message, binary encode a sequential number of the micro cycle in which the periodic message is scheduled for the first time, to obtain K binary codes;
a joining unit, adapted to join the K binary codes into a string of binary codes;
an iterative population generating unit, adapted to initialize the string of binary codes randomly, to generate an iterative population including M individuals.

7. The system for train periodic message scheduling based on a multi-objective evolutionary algorithm according to claim 5, wherein
in the fitness value calculating module, the first objective calculation function is:

$$F = \sum_{k}^{K} \text{Decimal}(Bin_k),$$

where $Bin_k$ denotes a k-th binary code, $\text{Decimal}(Bin_k)$ denotes the decimal version of the k-th binary code;
in the fitness value calculating module 400, the second objective calculation function is:

$$T_{Mp} = N * \max_{n \in \{1,\ldots,N\}} \frac{T_{actual(n)}}{60\%},$$

where $T_{actual(n)}$ denotes the actual processing time of an n-th micro cycle.

8. The system for train periodic message scheduling based on a multi-objective evolutionary algorithm according to claim 5, wherein the next-generation iterative population generating module comprises:
a current number of iterations updating unit, adapted to add 1 to the current number of iterations, to update the current number of iterations;
a dominated selection unit, adapted to perform dominated selection, using a Pareto dominated strategy, on the individuals of the updated iterative population according to the fitness value of each individual;
a next-generation iterative population generating unit, adapted to sequence the individuals after the dominated selection, and select the top M individuals to form a next-generation iterative population.

* * * * *